United States Patent [19]

Boudreau et al.

[11] 4,267,195

[45] May 12, 1981

[54] DOG FOOD FLAVORS

[75] Inventors: James C. Boudreau; Thomas D. White, both of Houston, Tex.

[73] Assignee: University of Texas, Austin, Tex.

[21] Appl. No.: 888,795

[22] Filed: Mar. 21, 1978

Related U.S. Application Data

[63] Continuation of Ser. No. 722,103, Sep. 10, 1976, abandoned.

[51] Int. Cl.$^3$ ............................................... A23K 1/00
[52] U.S. Cl. ........................................... 426/2; 426/72; 426/74; 426/534; 426/535; 426/537; 426/623; 426/630; 426/635; 426/656; 426/805
[58] Field of Search ...................... 426/72, 74, 2, 635, 426/623, 630, 534–538, 805, 807

[56] References Cited

U.S. PATENT DOCUMENTS

| | | | |
|---|---|---|---|
| 3,119,691 | 1/1964 | Ludington et al. | 426/293 X |
| 3,524,747 | 8/1970 | O'Hara et al. | 426/537 |
| 3,653,908 | 4/1972 | Buck et al. | 426/805 X |
| 3,745,023 | 7/1973 | Greenberg | 426/805 X |
| 3,830,798 | 8/1974 | Herndon et al. | 426/805 |
| 3,832,471 | 8/1974 | Siregar | 426/805 X |
| 3,857,968 | 12/1974 | Haas et al. | 426/805 X |
| 4,000,318 | 12/1976 | Ferguson et al. | 426/807 X |

OTHER PUBLICATIONS

Boudreau et al., "Single Unit Recordings from the Geniculate Ganglion of the Facial Nerve of the Cat", Exp. Brain Res., vol. 13, pp. 461–488, (1971).
Kruger et al., "Responses of Cat Geniculate Ganglion Tongue Units to Some Salts & Physiological Buffer Solutions", Brain Res., vol. 47, pp. 127–145.
Boudreau et al., "Classification of Chemoresponsive Tongue Units of the Cat Geniculate Ganglion", Brain Res., vol. 54, pp. 157–175, (1973).
Boudreau, "Neural Encoding in Cat Geniculate Ganglion Tongue Units Chemical Senses & Flavor", vol. 1, pp. 41–51, (1974).
White et al., "Taste Preferences of the Cat for Neuro Physiologically Active Compounds", Physiological Psychology, vol. 3, pp. 405–410, (1975).
Boudreau et al., "Chemical Stimulus Determinants of Cat Geniculate Ganglion Chemoresponsive Gp III Unit Discharges Chem. Senses & Flavor", pp. 495–517, (1975).
Boudreau et al., "Cat Neural Taste Responses to Nitrogen Compounds", ACS Symposium Series 26, (1976).

Primary Examiner—R. B. Penland
Attorney, Agent, or Firm—Mitchell E. Alter; Thadius J. Carvis; Bruno P. Struzzi

[57] ABSTRACT

The present invention identifies certain compounds, naturally present in raw meat, which are especially taste active in the dog. These compounds, which have been found to maximally activate taste neurons, are L-proline, L-cysteine, L-histidine, L-lysine, inosine 5'-triphosphate (ITP), inosine 5'-diphosphate (IDP), and adenosine 5'-triphosphate (ATP). Application of these compounds to dog foods in effective amounts can increase their palatability for dogs.

10 Claims, No Drawings

DOG FOOD FLAVORS

This is a continuation of application Ser. No. 722,103, filed Sept. 10, 1976 now abandoned.

BACKGROUND OF THE INVENTION

The present invention relates to dog food flavors and more particularly to dog foods having increased palatability due to these flavors and methods for producing the dog foods in increased palatability.

There is a continuing effort being made to develop processes and formulations which increase the palatability of dog foods, while at the same time maintaining their nutritional value. While, by itself, the development of nutritious dog foods is quite well understood and poses few problems to the art, there is a continuing problem of making these formulations palatable. Where an offered food is unpalatable, a dog may pass it up and thereby not take advantage of its nutritional value.

Many attempts have been made to obtain increased palatability of pet foods by the addition of a variety of materials. In U.S. Pat. No. 3,653,908 to Buck et al, it is disclosed that amino acids in general can improve palatability when included to cat foods, especially when reacted with reducing sugars. In another recent patent, U.S. Pat. No. 3,857,968 to G. J. Haas et al, there is disclosed a process for improving the palatability of animal foods based on an enzymatic hydrolysate of a fat and protein. Also, recent U.S. Pat. No. 3,830,798 discloses a method for hydrolyzing ribonucleic acid for addition to dog foods, and U.S. Pat. No. 3,832,471 discloses the use of 5'-nucleotide containing flavors for cat foods. Numerous other patents and publications also indicate a need for, and a keen interest in, improving the palatability of dog foods.

SUMMARY OF THE INVENTION

Accordingly, it is an object of the present invention to provide dog foods of improved palatability.

It is a further object of the present invention to provide a process for improving the palatability of dog foods.

These and other objects are accomplished according to the present invention by incorporating an effective amount of a palatability enhancing material selected from the group consisting of L-proline, L-cysteine, L-histidine, L-lysine, inosine 5'-triphosphate (ITP), inosine 5'-diphosphate (IDP), and adenosine 5'-triphosphate (ATP), or a combination of these, into the dog food formulation. Significant palatability boosts can be obtained by feeding dog foods improved by these palatability enhancers to dogs.

DETAILED DESCRIPTION OF THE INVENTION

The term "palatability" is broad and encompasses all of the various properties of the foods sensed by the dog. Among these properties are texture, taste and aroma. It is believed that the present invention increases the overall palatability of a dog food by improving the taste of the food through the introduction of highly pronounced levels of those raw meat flavor notes most preferred by dogs. Thus, the compounds identified according to this invention are referred to herein alternatively as dog food flavors or palatability enhancers.

The compounds identified by this, i.e., L-proline, L-cysteine, L-histidine, L-lysine, inosine 5'-triphosphate, (ITP), inosine 5'-diphosphate (IDP), and adenosine 5'-triphosphate (ATP), can improve the attractiveness and acceptance by dogs, of a variety of foods formulated for them. Among these foods are the conventional dry, intermediate-moisture and canned dog foods of conventional formulation; as well as soups or gravies for use alone or in combination with any of the other dog food forms. Typical formulations of dry dog foods and their methods of preparation are those described in U.S. Pat. Nos. 3,365,297 and 3,330,503; especially suitable use of the present invention can be made where the meat contents of these foods is reduced or eliminated. Typical of the intermediate-moisture dog foods are those described in U.S. Pat. No. 3,202,514 to Burgess et al and United Kingdom Pat. No. 1,151,991. The disclosure of all of these above-mentioned patents are hereby incorporated by reference. Especially suitable among the dog foods which can be improved by the dog food flavors or palatability enhancers identified according to the present invention, are soups and gravies for dog use. These soups and gravies can consist of, or consist essentially of, water and effective flavoring amounts of the dog food flavors. Plain water solutions of the pet food flavors identified by the present invention cause strong taste response by dogs. For gravies, a bland thickening medium will ordinarily be employed, and such thickeners can also be employed in soups. Among the suitable bland thickeners are those hydrophilic colloids, such as carboxymethyl cellulose, sodium alginate, kelp-derived gums, and the like, which are known in the art. The foods if desired can be full-feeding, nutritionally balanced dog foods containing protein, fat, carbohydrates, vitamins and minerals, so long as the complex formulations do not present their own flavor profiles which totally mask or obscure the flavors applied according to this invention.

When employed with a solid dog food of the types mentioned above, the dog food flavor compositions of this invention are desirably coated on the outside of the food, and preferably are applied in a manner which allows their release into any water used for hydration. Where the dog food has an exterior fat coating, the flavor compound is preferably applied to the exterior of the fat coating. The dog food flavors can also be incorporated interiorly of the food, such as by simple mixing with the other ingredients during preparation. However, because this generally causes excessive losses in the strength of the flavor, this is not usually preferred.

The active taste compounds identified by this invention are employed with the dog food in any amount which is effective for its flavor as such to be observed by the dog, and are desirably employed at levels effective to produce a significant improvement in palatability for the dog food. Based on aqueous solutions, effective concentrations of the dog food flavors are within the range of from 0.1 to 500 mM. Strong responses are observed at levels of from 50 to 125 mM in aqueous solution. Variation from and within these ranges will obviously occur depending upon the particular dog food formulation and its processing history, as well as the manner of application of the flavors.

The dog foods containing the dog food flavors of this invention are fed to dogs in normal manner, except for the fact that they are treated at some point to incorporate the dog food flavors and the dogs can be expected to prefer them to untreated foods of similar formulation. Along this line, test have shown all of the dog food flavors of this invention to cause strong taste responses in dogs when given in aqueous solution. And, aqueous gravies consisting of water and L-cysteine, L-histidine, or a combination of ½ part ATP with one part each of L-proline, L-cysteine and L-histidine, served with a commercial dry dog food having its own gravy former were effective in improving the palatability of the dog food yet further. Effective levels in this case, where a 100 gram sample of the food was fed with 150 grams of warm water, were 1% and 3% by weight of the dry weight of the dog food for L-cysteine; 3% of the dry weight of the dog food for L-histidine; and 1%, 3% and 6% of the dry weight of the dog food for the combination of flavors. Test employing, on the same basis, 3% ATP, 1% and 3% L-proline, and 1% L-lysine did not show palatability boosts over the highly flavorful control, probably because the flavors of this invention represent raw meat flavors which were overpowered and obscured by the heavy cooked meat flavor inherent in the untreated dog food.

The above explanation is presented for the purpose of enabling those skilled in the art how to practice the invention. However, upon reading this disclosure, many modifications and variations of the specific disclosure will become apparent to those skilled in the art. It is intended that all such modifications and variations be included within the scope of the invention which is defined by the following claims.

What is claimed is:

1. A process for improving the palatability of a nutritionally balanced dog food containing protein, fat, carbohydrates, vitamins and minerals, consisting essentially of incorporating into the dog food an amount of a palatability improving material selected from the group consisting of L-proline, L-cysteine, L-histidine, L-lysine, inosine 5'-triphosphate, inosine 5'-diphosphate, adenosine 5'-triphosphate or a combination of these; the amount of the palatability improving material being effective to increase the palatability of the dog food.

2. A process according to claim 1 wherein the palatability improving material is employed in an aqueous gravy at a level of from 0.1 to about 500 mM.

3. A process according to claim 1 wherein the palatability improving material is L-proline.

4. A process according to claim 1 wherein the palatability improving material is L-cysteine.

5. A process according to claim 1 wherein the palatability improving material is L-histidine.

6. A process according to claim 1 wherein the palatability improving material is L-lysine.

7. A process according to claim 1 wherein the palatability improving material is inosine 5'-triphosphate.

8. A process according to claim 1 wherein the palatability improving material is inosine 5'-diphosphate.

9. A process according to claim 1 wherein the palatability improving material is adenosine 5'-triphosphate.

10. An improved process for feeding dogs consisting essentially of the steps of:
(a) preparing a nutritionally balanced dog food containing protein, fat, carbohydrates, vitamins and minerals;
(b) incorporating into said dog food a flavor therefor selected from the group consisting of L-proline, L-cysteine, L-lysine, L-histidine, inosine 5'-triphosphate, inosine 5'-diphosphate, adenosine 5'-triphosphate, and combinations of these, wherein the amount of said flavor is effective to increase the palatability of the dog food when consumed; and
(c) feeding the resulting flavored dog food to dogs.

* * * * *

REEXAMINATION CERTIFICATE (1069th)
United States Patent [19]
Boudreau et al.

[11] B1 4,267,195

[45] Certificate Issued Jun. 6, 1989

[54] DOG FOOD FLAVORS

[75] Inventors: James C. Boudreau; Thomas D. White, both of Houston, Tex.

[73] Assignee: University of Texas, Tex.

Reexamination Request:
No. 90/000,906, Nov. 13, 1985

Reexamination Certificate for:
Patent No.: 4,267,195
Issued: May 12, 1981
Appl. No.: 888,795
Filed: Mar. 21, 1978

Related U.S. Application Data

[63] Continuation of Ser. No. 722,103, Sep. 10, 1976, abandoned.

[51] Int. Cl.⁴ .................................................. A23K 1/00
[52] U.S. Cl. ........................................ 426/2; 426/72; 426/74; 426/534; 426/535; 426/537; 426/623; 426/630; 426/635; 426/656; 426/805
[58] Field of Search ................... 426/2, 72, 74, 623, 426/630, 635, 534, 535, 805, 807

[56] References Cited

U.S. PATENT DOCUMENTS

| | | |
|---|---|---|
| 3,83,798 | 8/1974 | Herndon et al. |
| 3,119,691 | 1/1964 | Ludington et al. |
| 3,524,747 | 8/1970 | O'Hara et al. |
| 3,552,978 | 1/1971 | Inklaar |
| 3,832,471 | 8/1974 | Siregar |
| 3,857,968 | 12/1974 | Haas et al. ................ 426/602 |

FOREIGN PATENT DOCUMENTS

7033743 10/1970 Japan ................................. 426/650

OTHER PUBLICATIONS

Petfood Industry, Sep.–Oct., 1966, "Nose Ahead of Your Competitors With 'Sniff Appeal'," The Rath Packing Co.

Tokushima Journal of Exp. Medicine (Japan), vol. 16(3), pp. 177–181 (Dec. 1969), "Effect of Lysine and Threonine Supplementation on Digestion and Absorption of Wheat Protein", by Fukui et al.

Petfood Industry, Mar., 1961, "The Challenge of Laboratory Animal Feeds", by Thomas E. Kanakis (pp. 8–11).

Petfood Industry, May, 1959, "Amino Acids and Protein", by Dr. G. T. Edds (pp. 12–13).

*Primary Examiner*—R. B. Penland

[57] ABSTRACT

The present invention identifies certain compounds, naturally present in raw meat, which are especially taste active in the dog. These compounds, which have been found to maximally activate taste neurons, are L-proline, L-cysteine, L-histidine, L-lysine, inosine 5'-triphosphate (ITP), inosine 5'-diphosphate (IDP), and adenosine 5'-triphosphate (ATP). Application of these compounds to dog foods in effective amounts can increase their palatability for dogs.

under 35 U.S.C. 307

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 6 is confirmed.

Claims 1, 3–5 and 7–9 are cancelled.

Claims 2 and 10 are determined to be patentable as amended.

New claims 11–14 are added and determined to be patentable.

2. A process according to claim [1] *6* wherein the [palatability improving material] *L-lysine* is employed in an aqueous gravy at a level of from 0.1 to about 500 mM.

10. An improved process for feeding dogs consisting essentially of the steps of:

(a) preparing a nutritionally balanced dog food containing protein, fat, carbohydrates, vitamins and minerals;

(b) [incorporating into said dog food a flavor therefor selected from the group consisting of L-proline, L-cysteine, L-lysine, L-histidine, inosine 5'-triphosphate, inosine 5'-diphosphate, adenosine 5'-triphosphate and combinations of these, wherein the amount of said flavor is effective to increase the palatability of the dog food when consumed; and] *incorporating into the dog food an amount of L-lysine, the amount of L-lysine being effective to increase the palatability of the dog food; and*

(c) feeding the resulting flavored dog food to dogs.

*11. A process for improving the palatability of a nutritionally balanced dog food containing protein, fat, carbohydrates, vitamins and minerals consisting essentially of: coating on the outside of the dog food an amount of L-lysine, the amount of L-lysine being effective to increase the palatability of the dog food.*

*12. An improved process for feeding dogs consisting essentially of the steps of:*

*(a) preparing nutritionally balanced dog food containing protein, fat, carbohydrates, vitamins and minerals;*

*(b) coating on the outside of said dog food an amount of L-lysine, the amount of L-lysine being effective to increase the palatability of the dog food;*

*(c) feeding the resulting flavored dog food to dogs.*

*13. The process of claim 12 wherein the dog food further includes an exterior fat coating and the L-lysine is applied to the fat coating.*

*14. A process according to claims 11, 12 or 13 wherein the L-lysine is employed in an aqueous gravy at a level of from 0.1 to 500 mM.*

* * * * *